United States Patent
Park et al.

(10) Patent No.: US 8,691,445 B2
(45) Date of Patent: Apr. 8, 2014

(54) POSITIVE ELECTRODE INCLUDING PARTICLES HAVING BIMODAL SIZE DISTRIBUTION FOR LITHIUM SECONDARY BATTERY AND LITHIUM SECONDARY BATTERY HAVING THE SAME

(75) Inventors: Jung Joon Park, Yongin-si (KR); Jae Chul Um, Yongin-si (KR); Myung Hyo Shin, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 1017 days.

(21) Appl. No.: 11/410,053

(22) Filed: Apr. 25, 2006

(65) Prior Publication Data

US 2006/0263691 A1    Nov. 23, 2006

(30) Foreign Application Priority Data

Apr. 28, 2005   (KR) .............................. 10-2005-35472

(51) Int. Cl.
H01M 4/36    (2006.01)
H01M 4/48    (2010.01)
H01M 4/58    (2010.01)
H01M 4/505   (2010.01)
H01M 4/525   (2010.01)

(52) U.S. Cl.
USPC ................... 429/231.95; 429/209; 429/218.1; 429/224; 429/231.1; 429/231.9

(58) Field of Classification Search
USPC ..................................... 429/231.95
See application file for complete search history.

(56) References Cited

U.S. PATENT DOCUMENTS

| 6,794,036 B2 | 9/2004 | Matsumoto et al. |
| 6,818,351 B2 | 11/2004 | Sunagawa et al. |
| 2006/0025688 A1 | 2/2006 | Hayase et al. |
| 2006/0246356 A1* | 11/2006 | Abe et al. ...................... 429/326 |

FOREIGN PATENT DOCUMENTS

| JP | 11-273678 | 10/1999 |
| JP | 2000082466 A * | 3/2000 |
| JP | 2002-251996 | 9/2002 |
| JP | 2004-119218 | 4/2004 |
| JP | 2004-121735 | 4/2004 |
| JP | 2005-005208 | 1/2005 |
| KR | 2004-15314 | 2/2004 |
| KR | 2005-30899 | 3/2005 |
| WO | WO 2004/030125 A1 | 4/2004 |

OTHER PUBLICATIONS

Machine translation of JP 2004-119218, Kazuhara et al., Apr. 15, 2004.*
Abstract for WO 2004/030125 A1.
Korean Examination Report issued in Korean Patent Application No. 2005-35472 on Jun. 29, 2006.
English machine translation of Japanese Publication No. 2005-005208.

* cited by examiner

*Primary Examiner* — Kwang Han
(74) *Attorney, Agent, or Firm* — Christie, Parker & Hale, LLP

(57) ABSTRACT

A positive electrode for a lithium secondary battery includes a positive activation material mixture that intercalates and de-intercalates lithium ions, wherein a first positive activation material having an average particle diameter D50 of from 12.5 μm to 22 μm and a second positive activation material having an average particle diameter D50 of from 1 μm to 5 μm are mixed with a weight ratio of from 95:5 to 60:40.

16 Claims, 2 Drawing Sheets

POSITIVE ELECTRODE INCLUDING PARTICLES HAVING BIMODAL SIZE DISTRIBUTION FOR LITHIUM SECONDARY BATTERY AND LITHIUM SECONDARY BATTERY HAVING THE SAME

CROSS-REFERENCE TO RELATED APPLICATIONS

This application claims the benefit of Korean Application No. 2005-35472, filed Apr. 28, 2005, in the Korean Intellectual Property Office, the disclosure of which is incorporated herein by reference.

BACKGROUND OF THE INVENTION

1. Field of the Invention

Aspects of the present invention relate to a positive electrode for a lithium secondary battery and a lithium secondary battery having the positive electrode, and more particularly, to a positive electrode for a lithium secondary battery capable of increasing a volume ratio of a positive electrode and maximizing a performance of the battery and a lithium secondary battery having the positive electrode.

2. Description of the Related Art

Recently, in the rapid development of electronic, communication, and computer industries, small-sized light-weight high-performance portable electric apparatuses such as camcorders, mobile phones, and notebook PCs have been widely used. Therefore, demands for batteries having a light weight, a long life cycle, and high reliability have increased. A lithium secondary battery has an operating voltage of 3.7 V or more, which is three times higher than that of a nickel cadmium battery or a nickel-hydrogen battery. In addition, lithium secondary batteries have a higher energy density per unit weight than nickel cadmium batteries or nickel-hydrogen batteries. Therefore, lithium secondary batteries have been used as a substitute for nickel cadmium batteries or nickel-hydrogen batteries in portable electronic apparatuses.

The lithium secondary battery generates electric energy through oxidation and reduction reactions while lithium ions are intercalated and de-intercalated at positive and negative electrodes. The lithium secondary battery is constructed by using positive and negative activation materials capable of reversibly intercalating and de-intercalating lithium ions and charging an organic or polymer electrolyte solution between the positive and negative electrodes.

Typically, lithium metal has been used as the negative activation material for the lithium secondary battery. However, when lithium metal is used, dendrites may be formed, and the battery may explode due to a short-circuit. Therefore, to replace the lithium metal, carbon-based materials such as amorphous carbon and crystalline carbon have been developed.

The positive activation material has the most important function for performance and safety of the lithium secondary battery. A chalcogenide compound may be used for the positive activation material. As an example thereof, research has been carried out on a composite metal oxide such as a composite of $LiCoO_2$, $LiMn_2O_4$, $LiNiO_2$, $LiNi_{1-x}Co_xO_2$ (0<x<1), and $LiMnO_2$.

Among the positive activation materials, an Mn-based positive activation material has advantages in that it can be easily synthesized with low cost and generates a low level of environmental contaminants, but it has a disadvantage of a small capacitance. A Co-based positive activation material has advantages of a high electric conductivity, a high battery voltage, and excellent electrode characteristics, but it has a disadvantage of a high cost. A Ni-based positive activation material has advantages of the lowest cost and the highest discharge capacitance of the aforementioned positive activation materials, but it has a disadvantage in that it is not easy to synthesize.

In the recent research efforts to find better positive activation materials for the lithium secondary battery, much attention has been paid to finding a material that can be used as a substitute for $LiCoO_2$ and that is capable of having stability at a high charge voltage of 4.2 or more, a high energy density, and a long life cycle. For example, $LiCoO_2$, $LiNiO_2$ derivative compounds obtained by changing compositions of Ni, Co, and Mn in the compounds $LiNi_xCo_{1-x}O_2$ (0<x<1), $LiNi_xMn_{1-x}O_2$ (0<x<1), and $Li(Ni_xCo_{1-2x}Mn_x)O_2$ (0<x<1) have been developed (see Solid State Ionics, 57, 311 (1992), J. Power. Sources, 43-44, 595 (1993), Japanese Patent Application Publication No. H8-213015 (Sony (1996)), and U.S. Pat. No. 5,993,998 (Japan Storage Battery) (1997)). However, the positive activation materials obtained by simply changing the composition of Ni, Co, and Mn have not yet been found to be a good substitute for $LiCoO_2$.

On the other hand, a high capacity battery using a positive electrode formed with high composite slurry has been proposed. The positive electrode is constructed by dispersing a positive electrode composite into a solvent such as N-methyl-2-pyrolidone to form a positive electrode composite slurry, coating the positive electrode composite slurry onto an aluminum foil, and drying the slurry. Generally, in order to increases the density of the composite, a rolling process is performed. If the density of the positive electrode composite is increased, the capacity per unit volume is increased, so that the capacity of the battery can be increased. However, when a rolling process is used, the activation material particles may be crushed or destroyed, depending on the particle sizes or types of the positive activation materials, and the composite layer may peel off or become detached. Therefore, it is difficult to increase the density of the positive electrode composite by a rolling process. In addition, since an electrolyte solution cannot easily permeate into a positive electrode composite layer that has a high density, charge and discharge characteristics may be degraded. In addition, in a course of charge and discharge cycles, the capacity of the battery may deteriorate.

SUMMARY OF THE INVENTION

Aspects of the present invention provide a positive electrode for a lithium secondary battery capable of increasing the capacity per unit volume and maximizing the performance of the battery by increasing the composite density. Aspects of the present invention further provide a lithium secondary battery having the positive electrode.

According to an aspect of the present invention, there is provided a positive electrode for a lithium secondary battery, the positive electrode including a positive activation material mixture that intercalates and de-intercalates lithium ions, wherein, in a graph plotting particle size versus percent in a positive activation material mixture having particles of an average particle diameter $D_{50}$ of from 12.5 μm to 22 μm and particles having an average particle diameter $D_{50}$ of from 1 μm to 5 μm measured by a laser diffraction particle size analyzer, a peak value for a second positive activation material having an average particle diameter $D_{50}$ of from 1 μm to 5 μm to a ratio of a peak value for a first positive activation material having an average particle diameter $D_{50}$ of from 12.5 μm to 22 μm is in a range of from 0.07:1 to 0.20:1.

According to another aspect of the present invention, there is provided a lithium secondary battery comprising a positive electrode as described in the preceding paragraph, a negative electrode including a negative activation material that intercalates and de-intercalates lithium ions; and a non-aqueous electrolyte solution.

According to another aspect of the present invention, there is provided a positive electrode for a lithium secondary battery including a positive activation material mixture that intercalates and de-intercalates lithium ions; wherein the positive activation material mixture comprises a first positive activation material having an average particle diameter $D_{50}$ of from 12.5 μm to 22 μm and a second positive activation material having an average particle diameter $D_{50}$ of from 1 μm to 5 μm, wherein the first activation material and the second activation material are mixed with a weight ratio of from 95:5 to 60:40.

According to another aspect of the present invention, there is provided a lithium secondary battery comprising a positive electrode as described in the preceding paragraph, a negative electrode including a negative activation material that intercalates and de-intercalates lithium ions; and a non-aqueous electrolyte solution.

According to another aspect of the present invention, there is provided an activation material mixture that intercalates and de-intercalates lithium ions, comprising a first activation material having an average particle diameter $D_{50}$ of from 12.5 μm to 22 μm and a second activation material having an average particle diameter $D_{50}$ of from 1 μm to 5 μm, wherein a weight ratio of the first activation material to the second activation material in the activation material mixture is from 95:5 to 60:40

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

As shown in FIG. 1, a peak value Hb corresponds to a difference between the highest point corresponding to the first positive activation material and the minimum peak value, and the peak value Hs corresponds to a difference between the highest point corresponding to the second positive activation material and the minimum peak value. From the peak values Hb and Hs, a ratio Hs/Hb can be calculated, and a positive activation material mixture can be defined in terms of its ratio Hs/Hb. according to an aspect of the present invention;

DETAILED DESCRIPTION OF THE EMBODIMENTS

Figure 1:
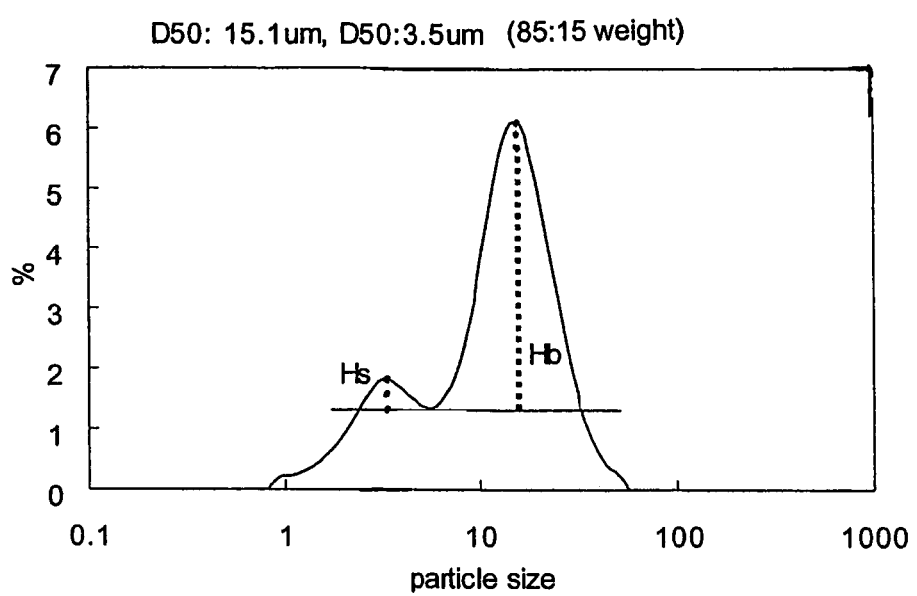
FIG. 1 is a graph plotting particle size versus percent of a positive activation material mixture. The positive activation material mixture of FIG. 1 contains a first positive activation material having an average particle diameter D50 of 15.1 μm and a second positive activation material having an average particle diameter D50 of 3.5 μm, wherein the ratio of the first positive activation material to the second positive activation material is 85:15 by weight. The graph of FIG. 1 further shows that in the plot of particle sizes, there are two peaks, corresponding to the first positive activation material and the second positive activation material, and a minimum peak value between the two peaks.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
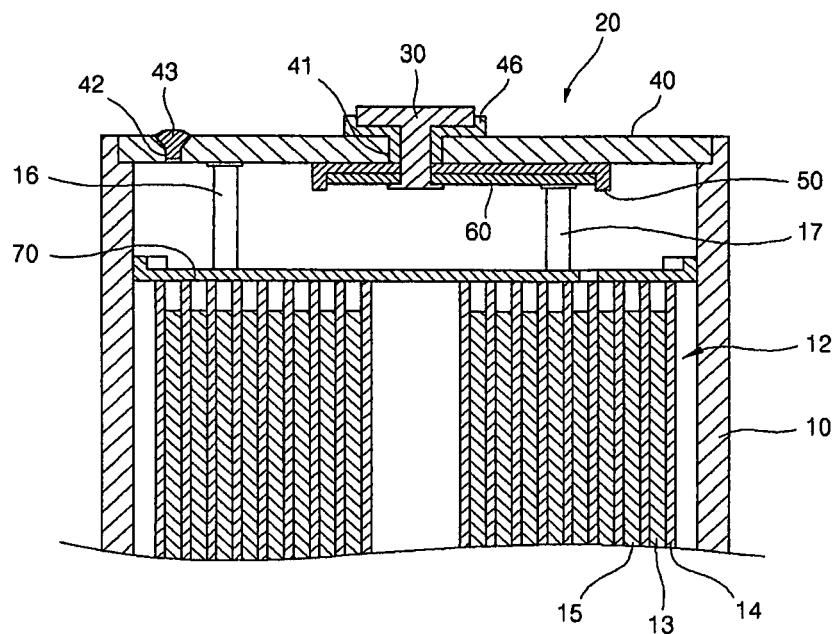
FIG. 2 is a schematic view showing a construction of a lithium secondary battery according to an aspect of the present invention.

An embodiment of a lithium secondary battery having a positive electrode according to the present invention is shown in FIG. 2. Referring to FIG. 2, the lithium secondary battery according to the embodiment is constructed by inserting an electrode assembly 12 including a positive electrode 13, a negative electrode 15, and a separator 14 together with an electrolyte solution in a can 10 and sealing an upper portion of the can 10 with a cap assembly 20. The cap assembly 20 includes a cap plate 40, an insulating plate 50, a terminal plate 60, and an electrode terminal 30. The cap assembly 20 engages with an insulating case 70 to seal the can 10.

The electrode terminal 30 is inserted into a terminal through hole which is formed at a center of the cap plate 40. When the electrode terminal 30 is inserted into the terminal through hole, a tube-type gasket 46 surrounding an outer surface of the electrode terminal 30 is also inserted in order to insulate the electrode terminal 30 from the cap plate 40. After the cap assembly 20 is assembled to an upper portion of the can 10, an electrolyte solution is injected through an electrolyte solution injection hole 42, and the electrolyte solution injection hole 42 is closed with a cork 43. The electrode terminal 30 is connected to a negative tab 17 of the negative electrode 15 or a positive tab 17 of the positive electrode 16, thereby serving as a negative terminal or a positive terminal.

In FIG. 2, a square shaped battery is shown. However, the present invention is not limited to this type, but may be a cylindrical type, a coin type, a pouch type, or other types.

Aspects of the present invention provide a positive electrode having an increased volume density capable of increasing the capacity of a lithium secondary battery. In order to increase the volume density thereof, there is a need for selecting a particle size distribution that is capable of maximizing a packing ratio between positive activation material particles. However, there is a trade-off relation between the maximization of the packing ratio and the performance of the lithium secondary battery, so that an optimization thereof is needed.

According to an aspect of the present invention, it is possible to increase the packing ratio between the positive activation material particles by mixing two types of positive activation materials having different particle size distributions in a predetermined ratio. The increase in the packing ratio can be tested by measuring the density of a pellet that is formed by pressing a powder mixture of the positive activation materials. By calculating the density of a pellet of the positive activation material, the density of a composite slurry of a positive electrode plate can be estimated.

According to an aspect of the present invention, a first positive activation material having an average particle diameter $D_{50}$ of from 13 μm to 17 μm and a second positive activation material having an average particle diameter $D_{50}$ of from 2 μm to 4 μm may be mixed. The weight ratio of the first positive activation material to the second positive activation material may be in a range of from 95:5 to 60:40, or, for example, from 90:10 to 70:30.

By mixing two types of the positive activation materials having different average particle diameters $D_{50}$ in a predetermined ratio, it is possible to increase the volume density of the positive electrode plate and to obtain a long life cycle of the battery. The average particle diameters of the positive activation materials and peak values thereof are measured by a laser diffraction particle size analyzer. The peak values measured by the analyzer are not absolute values but relative values. As shown in FIG. 1, differences between a minimum peak value (between two peak values for the two types of the positive activation materials) and the peak values for two positive activation materials are defined as peak values Hs and Hb, respectively. The laser diffraction particle size analyzer used to calculate the values of FIG. 1 was a Microtrac HRA-100 Version 10.1.2-016SE, which is a wet-type instrument using laser diffraction. As the measurement conditions, water was used a dispersion medium; particle transmittance was measured in a reflecting mode; and run time was set to 30 seconds. In addition, in the measurement, there is no limitation on the shape of particles and the refractive index of the particles. In addition, a refractive index of the medium was set to 1.33.

The first positive activation material and the second positive activation material may be made of a lithium composite oxide capable of intercalating and de-intercalating lithium ions. The first positive activation material and the second positive activation material may have the same chemical composition and differ from each other only in their average particle diameters $D_{50}$ or may differ from each other in chemical composition as well as average particle diameters $D_{50}$. For example, the first positive activation material and the second positive activation material may each be independently selected as from the group consisting of compounds of the following Chemical Formula 1 and 2.

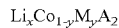  [Chemical Formula 1]

$$Li_xCo_{1-y}M_yA_2$$

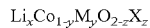  [Chemical Formula 2]

$$Li_xCo_{1-y}M_yO_{2-z}X_z$$

In Chemical Formulas 1 and 2, $0.9 \leq x \leq 1.1$, $0 \leq y \leq 0.5$, $0 \leq z \leq 0.5$, M is an element selected from the group consisting of Mg, Al, Co, K, Na, Ca, Si, Ti, Sn, V, Ge, Ga, B, As, Zr, Mn, Cr, Fe, Sr, V, and rare earth elements, A is an element selected from the group consisting of O, F, S, and P, and X is F, S, or P.

The lithium composite oxide may be formed by mixing a lithium compound, a cobalt compound, and a compound including at least one element selected from the group consisting of Mg, Al, Co, K, Na, Ca, Si, Ti, Sn, V, Ge, Ga, B, As, Zr, Mn, Cr, Fe, Sr, V, and a rare earth element with a small amount of a fluoric salt, a sulfuric salt, or a phosphoric salt and sintering a mixture thereof. The mixing process may be a dry-type process, a wet-type process, or any other types. A temperature of sintering may be in a range of from 200° C. to 1000° C. The sintering process may be performed in an oxygen ambience or an inert gas ambience, but the process is not limited thereto. The sintering process may be repeated for as many times as needed. After the sintering process, a suitable cooling process may be performed, and as needed, a crushing process may be performed. As a result, the lithium composite oxide is obtained.

As the lithium compound, lithium hydroxide, lithium carbonate, lithium nitrate, or lithium acetate may be used. As the cobalt compound, cobalt oxide, cobalt nitrate, cobalt acetate, cobalt hydroxide, cobalt carbonate, a nickel cobalt salt, or a nickel cobalt manganese salt may be used. As the compound including at least one element selected from the group consisting of Mg, Al, Co, K, Na, Ca, Si, Ti, Sn, V, Ge, Ga, B, As, Zr, Mn, Cr, Fe, Sr, V, and a rare earth element, a oxide, a hydroxide, a carbonate, a nitrate, or an organic acid salt thereof may be used. As the fluoric salt, manganese fluoride ($MnF_3$), lithium fluoride (LiF), nickel fluoride ($NiF_2$), calcium fluoride ($CaF_2$), or zinc fluoride ($ZnF_2$) may be used. As the sulfuric salt, manganese sulfide (MnS) or zinc sulfide (ZnS) may be used. As the phosphoric salt, $H_3PO_4$ may be used.

The positive electrode may further include conductive materials for improving electric conductivity. The conductive material may include at least one material selected from the group consisting of a graphite based conductor, a carbon black based conductor, and a metal or metal compound based conductor. The graphite based conductor may include artificial graphite, natural graphite, and the like. The carbon black based conductor may include acetylene black, ketjen black, denka black, thermal black, channel black, and the like. The metal or metal compound based conductor may include tin, tin oxide, tin phosphoric acid ($SnPO_4$), titanium oxide, potassium titanic acid, perovskite such as $LaSrCoO_3$, and $LaSrMnO_3$, and the like. However, the present invention is not limited to the aforementioned conductors.

The composition of the positive activation material may be in a range of from 0.1 to 10 wt % of the electrode activation material. If the composition of the conductor is less than 0.1 wt %, the electrochemical property may be degraded. If the composition of the conductor is larger than 10 wt %, the energy density per unit weight is reduced.

According to aspects of the present invention, the positive electrode is constructed by mixing a first positive activation material, having an average particle diameter $D_{50}$ of from 12.5 μm to 22 μm, and a second positive activation material, having an average particle diameter $D_{50}$ of from 1 μm to 5 μm, at a weight ratio of from 95:5 to 60:40 to form a positive activation material mixture, dispersing a positive electrode composite including the positive activation material mixture, a conductive material, and a binder into a solvent to form a positive electrode composite slurry, coating the positive electrode composite slurry on a positive electrode charge collector, drying the slurry, and rolling the slurry with a roller press machine. In the positive electrode for a lithium secondary battery according to an aspect of the present invention, the positive electrode composite has an average density of 3.75 g/cm³. The density of the positive electrode composite according to an aspect of the present invention is higher than a density (3.65 g/cm³) of a positive electrode composite of a positive electrode constructed with a conventional positive activation material.

The binder for activation materials has the functions of softening activation materials, consolidating inter-bonding of activation materials with a charge collector, buffering the swelling or shrinkage of the activation materials, and the like. For example, the binder may include polyvinylidene fluoride, copolymer of polyhexafluoropropylene and polyvinyledene fluoride (PVdF/HFP), poly(vinylacetate), polyvinyl alcohol, polyethylene oxide, polyvinyl pyrrolidone, alkylated polyethylene oxide, polyvinyl ether, poly(methyl methacrylate), poly(ethyl acrylate), polytetrafluoro ethylene, polyvinyl chloride, polyacrylonitrile, polyvinyl pyridine, styrene-butadiene rubber, acrylonitrile-butadiene rubber, and the like. The composition of the binder may be in a range of from 0.1 to 30 wt %, more preferably 1 to 10 wt % of the electrode activation material. If the composition of the binder is too small, the binding force between the activation material and the charge collector is not sufficient. If the composition of the binder is too large, the binding force is sufficient, but the amount of the electrode activation material is accordingly reduced. This is disadvantageous to increase the battery capacity.

The solvent used to disperse the positive electrode slurry may be aqueous or non-aqueous. For example, N-methyl-2-pyrolidone (NMP), di-methyl formamide, di-methyl acetamide, N,N-di-methylamino propylamine, ethylene oxide, tetrahydrofuran, or the like, may be used as the non-aqueous solvent.

The positive electrode charge collector may be made of a stainless steel, nickel, aluminum, titanium, or a combination or alloy thereof. Alternatively, the positive electrode charge collector may be constructed as an aluminum or stainless steel structure with a surface coated with carbon, nickel, titanium, or silver. As non-limiting examples, aluminum or an aluminum alloy may be used for the positive electrode. The positive electrode charge collector may be in the shape of a foil, a film, a sheet, a punched structure, a porous structure, or a foamed structure.

The negative electrode of a lithium secondary battery includes a negative electrode activation material into/from which lithium ions can be intercalated or de-intercalated. The negative electrode activation material includes carbon materials such as crystalline carbon, amorphous carbon, carbon composites, and carbon fiber, lithium metal, lithium alloy, or the like. For example, the amorphous carbon may include hard carbon, cokes, meso-carbon micro-beads (MCMB) plasticized in a temperature of 1500° C. or less, meso-phase pitch-based carbon fibers (MPCF), or the like. The crystalline structure carbon may include a graphite-based material, such as, for example, natural graphite, graphite-based cokes, graphite-based MCMB, graphite-based MPCF, or the like. The negative electrode activation material is preferably formed of crystalline structure carbon. More preferably, with respect to the carbon material, an inter-planar distance d002 thereof is in a range of from 3.35 Å to 3.38 Å, and a crystallite size Lc thereof as measured by X-ray diffraction is 20 nm or more. The lithium alloy may include an alloy with aluminum (Al), zinc (Zn), bismuth (Bi), cadmium (Cd), antimony (Sb), silicon (Si), lead (Pb), tin, gallium (Ga), or indium (In).

The negative electrode is constructed by forming a negative electrode composite including a negative electrode activation material and a binder, dispersing the negative electrode composite into a solvent to form a negative electrode composite slurry, coating the negative electrode composite slurry on a negative electrode charge collector, drying the slurry, and rolling the slurry with a roller press machine. The negative electrode composite may include a conductive material.

The negative electrode charge collector may be made of a stainless steel, nickel, copper, titanium, or a combination or alloy thereof. Alternatively, the negative electrode charge collector may be constructed with a copper or stainless steel structure having a surface coated with carbon, nickel, titanium, or silver. As non-limiting examples, copper or a copper alloy may be used for the negative electrode.

The non-aqueous electrolyte of a lithium secondary battery may, in addition to the lithium salt and the non-aqueous organic solvent, include an additive for improving charge/discharge characteristics and preventing an overcharge. The lithium salt functions as a source for supplying lithium ions in a lithium battery so as to enable the fundamental operation of the battery, and the non-aqueous organic solvent functions as a medium for transferring the ions involved in electrochemical reactions in the battery.

The lithium salt may include at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (x and y are natural numbers), LiCl, and LiI, or a mixture of two or more thereof. The concentration of the lithium salt may be in a range of from 0.6 M to 2.0M, preferably, from 0.7 M to 1.6M. If the concentration of the lithium salt is below 0.6M, the conductivity of the electrolyte is reduced, and the performance of the electrolyte is also degraded. If the concentration of the lithium salt is over 2.0M, the viscosity of the electrolyte increases, and mobility of the lithium salt is reduced.

The non-aqueous organic solvent may include at least one selected from the group consisting of a carbonate, ester, ether, and ketone, or a mixture of two or more of these. The organic solvent should have a high dielectric constant and a low viscosity in order to increase ion dissociation and facilitate conductivity of the ions. Typically, a mixed solvent composed of two or more solvents, of which one has a high dielectric constant and a high viscosity and the other has a low dielectric constant and a low viscosity, is used as the organic solvent.

When a carbonate based solvent is used as a non-aqueous organic solvent, a mixture, such as, for example, a mixture of a cyclic carbonate and a chain carbonate may be used. For example, ethylene carbonate (EC), propylene carbonate (PC), 1,2-butylene carbonate, 2,3-bytylene carbonate, 1,2-pentylene carbonate, 2,3-pentylene carbonate, vinylene carbonate (VC), or the like, may be used as the cyclic carbonate. For example, materials having a high dielectric constant, such as ethylene carbonate and propylene carbonate, may be used. When artificial graphite is used as the negative electrode activation material, ethylene carbonate may be used, for example. The chain carbonate may include dimethyl carbonate (DMC), diethyl carbonate (DEC), dipropyl carbonate (DPC), methylpropyl carbonate (MPC), ethylmethyl carbonate (EMC), ethylpropyl carbonate (EPC), or the like. For example, materials having a low viscosity, such as dimethyl carbonate, ethylmethyl carbonate, and diethyl carbonate may be used.

The ester may include methyl acetate, ethyl acetate, propyl acetate, methyl propionate, ethyl propionate, γ-butyrolactone (GBL), γ-valerolactone, γ-caprolactone, δ-valerolactone, ∈-caprolactone, and the like. The ether may include tetrahydrofuran, 2-methyltetrahydropuran, dibutylether, and the like. The ketone may include polymethylvinyl ketone, and the like.

The lithium secondary battery according to an aspect of the present invention may include a separator that prevents a short-circuit between the positive and negative electrodes and provides a transport channel of the lithium ions. As the separator, a polyolefin based material such as polypropylene and polyethylene, a multi-layered film thereof, a micro-porous film thereof, a woven textile fabric thereof, non-woven textile fabric thereof, or other well-known separator materials may be used. In addition, a film formed by coating a resin having an excellent stability on a micro-porous polyolefin film may be used.

Now, examples of the embodiments of the present invention and comparative examples are described. The later described examples are examples of the preferred embodiments of the present invention, but the present invention is not limited thereto.

The following examples compare the volume density of positive electrode plates and pellets for mixtures of positive electrode activation materials having various average particle diameters $D_{50}$ and various mixture ratios.

In the following examples, a first $LiCoO_2$ activation material, having a first activation diameter D50, is referred to as $LiCoO_2$ (A) and a second $LiCoO_2$ activation material, having a second activation diameter D50, is referred to as $LiCoO_2$ (B).

Comparative Example 1

A positive activation powder was formed by mixing $LiCoO_2$ (A) having an average particle diameter $D_{50}$ of 10.2 μm and $LiCoO_2$ (B) having an average particle diameter $D_{50}$ of 2.3 μm with a weight ratio of A:B=70:30. A positive electrode composite slurry was produced by adding the positive activation powder, an acetylene black conductive material, a polyvinylidene fluoride (PVdF) binder to an N-methyl-2-pyrrolidone (NMP) solvent. At this time, a weight ratio of (positive activation material):(conductive material):(binder) was 96:2:2. The slurry was coated on an aluminum foil and subjected to drying. The dried slurry was pressed to produce a positive electrode plate for a coin battery. In addition, the positive activation material formed by mixing $LiCoO_2$ (A) and $LiCoO_2$ (B) with a weight ratio of A:B=70:30 was pressed to produce a pellet.

Comparative Example 2

The same processes as those of Comparative Example 1 were performed, but with mixing of $LiCoO_2$ (A) having an average particle diameter $D_{50}$ of 10.2 μm and $LiCoO_2$ (B) having an average particle diameter $D_{50}$ of 3.5 μm.

Comparative Example 3

The same processes as those of Comparative Example 1 were performed, but with mixing of $LiCoO_2$ (A) having an average particle diameter $D_{50}$ of 10.2 μm and $LiCoO_2$ (B) having an average particle diameter $D_{50}$ of 5.0 μm.

Comparative Example 4

The same processes as those of Comparative Example 1 were performed, but with mixing of $LiCoO_2$ (A) having an average particle diameter $D_{50}$ of 12.3 μm and $LiCoO_2$ (B) having an average particle diameter $D_{50}$ of 2.3 μm.

Comparative Example 5

The same processes as those of Comparative Example 1 were performed, but with mixing of $LiCoO_2$ (A) having an average particle diameter $D_{50}$ of 12.3 μm and $LiCoO_2$ (B) having an average particle diameter $D_{50}$ of 3.5 μm.

Comparative Example 6

The same processes as those of Comparative Example 1 were performed, but with mixing of $LiCoO_2$ (A) having an average particle diameter $D_{50}$ of 12.3 μm and $LiCoO_2$ (B) having an average particle diameter $D_{50}$ of 5.0 μm.

Example 1

The same processes as those of Comparative Example 1 were performed, but with mixing of $LiCoO_2$ (A) having an average particle diameter $D_{50}$ of 15.1 μm and $LiCoO_2$ (B) having an average particle diameter $D_{50}$ of 2.5 μm.

Example 2

The same processes as those of Comparative Example 1 were performed, but with mixing of $LiCoO_2$ (A) having an average particle diameter $D_{50}$ of 15.1 μm and $LiCoO_2$ (B) having an average particle diameter $D_{50}$ of 3.5 μm.

Example 3

The same processes as those of Comparative Example 1 were performed, but with mixing of $LiCoO_2$ (A) having an average particle diameter $D_{50}$ of 15.1 μm and $LiCoO_2$ (B) having an average particle diameter $D_{50}$ of 5.0 μm.

Example 4

The same processes as those of Comparative Example 1 were performed, but with mixing of $LiCoO_2$ (A) having an average particle diameter $D_{50}$ of 18.8 μm and $LiCoO_2$ (B) having an average particle diameter $D_{50}$ of 2.3 μm.

Example 5

The same processes as those of Comparative Example 1 were performed, but with mixing of $LiCoO_2$ (A) having an average particle diameter $D_{50}$ of 18.8 μm and $LiCoO_2$ (B) having an average particle diameter $D_{50}$ of 3.5 μm.

Example 6

The same processes as those of Comparative Example 1 were performed, but with mixing of $LiCoO_2$ (A) having an average particle diameter $D_{50}$ of 18.8 μm and $LiCoO_2$ (B) having an average particle diameter $D_{50}$ of 5.0 μm.

Volume densities of the positive electrode plates and pallets manufactured according to Comparative Examples 1 to 6 and Examples 1 to 6 were measured, and the result of the measurements is shown in Table 1.

TABLE 1

|  | LiCoO2, A D50 (μm) | LiCoO2, B D50 (μm) | [Hs/Hb] * 100 (%) | Density of Pellet (g/cm$^3$) | Density of Electrode Plate (g/cm$^3$) |
|---|---|---|---|---|---|
| Comparative Example 1 | 10.2 | 2.3 | 3.5% | 3.68 | 3.65 |
| Comparative Example 2 |  | 3.5 | 1.3% | 3.65 | 3.63 |
| Comparative Example 3 |  | 5 | 1.0% | 3.5 | 3.52 |
| Comparative Example 4 | 12.3 | 2.3 | 5.8% | 3.71 | 3.65 |
| Comparative Example 5 |  | 3.5 | 2.7% | 3.69 | 3.66 |
| Comparative Example 6 |  | 5 | 1.2% | 3.56 | 3.52 |
| Example 1 | 15.1 | 2.3 | 13.2% | 3.83 | 3.81 |
| Example 2 |  | 3.5 | 10.3% | 3.85 | 3.84 |
| Example 3 |  | 5 | 7.6% | 3.67 | 3.62 |
| Example 4 | 18.8 | 2.3 | 18.2% | 3.89 | 3.92 |
| Example 5 |  | 3.5 | 16.5% | 3.93 | 3.91 |
| Example 6 |  | 5 | 11.3% | 3.62 | 3.68 |

(A:B = 70:30 weight ratio)

As shown in Table 1, when positive electrode activation materials having different average particle diameters $D_{50}$ are mixed with a predetermined ratio according to an aspect of the present invention, a positive electrode plate comprising the mixture has a high density. In particular, the positive electrode plates manufactured according to Examples 1, 2, 4, and 5 have a density of 3.8 g/cm³ or more, which is greater than the density of the positive electrode plates manufactured according to Comparative Examples 1 to 5. Further, it can be seen that the densities of the pellets manufactured with mixture powders of positive electrode activation materials are roughly equal to those of actual electrode plates.

Referring to Table 1 and FIG. 1, in measurement results with respect to particles sizes of the positive electrode activation materials measured by a particle size analyzer using laser diffraction, differences between a minimum peak value (between the peak values for a small-sized and large-sized positive electrode activation material particle groups) and the peak values for the smaller-sized and larger-sized positive electrode activation material particle groups are defined as peak values Hs and Hb, respectively. From the peak values Hs and Hb of a positive activation material mixture, a ratio Hs/Hb may be calculated, which may be expressed as a ratio or as a percent (when the ratio is multiplied by 100) In the Comparative Examples above, peak value ratios ((Hs/Hb)×100) have values of 5.8% or less. In contrast, in the embodiments of the Examples according to aspects of the present invention, the peak value ratios ((Hs/Hb)×100) are greater than the peak value ratios of the comparative Examples and range from 7% to 20%.

The following examples compare the density of pellets formed from mixtures of positive electrode activation materials according to various average particle diameters $D_{50}$ and various mixture ratios.

Example 7

A pellet was manufactured by obtaining a positive electrode activation material powder by mixing $LiCoO_2$ (A) having an average particle diameter $D_{50}$ of 15.1 μm and $LiCoO_2$ (B) having an average particle diameter $D_{50}$ of 3.5 μm with a weight ratio A:B=90:10 and pressing the positive electrode activation material powder.

Example 8

The same processes as those of Example 7 were performed, but with mixing of $LiCoO_2$ (A) having an average particle diameter $D_{50}$ of 15.1 μm and $LiCoO_2$ (B) having an average particle diameter $D_{50}$ of 3.5 μm with a weight ratio A:B=80:20.

Example 9

The same processes as those of Example 7 were performed, but with mixing of $LiCoO_2$ (A) having an average particle diameter $D_{50}$ of 15.1 μm and $LiCoO_2$ (B) having an average particle diameter $D_{50}$ of 3.5 μm with a weight ratio A:B=60:40.

Comparative Example 7

The same processes as those of Example 7 were performed, but with using only $LiCoO_2$ (A) having an average particle diameter $D_{50}$ of 15.1 μm.

Comparative Example 8

The same processes as those of Example 7 were performed, but with mixing of $LiCoO_2$ (A) having an average particle diameter $D_{50}$ of 15.1 μm and $LiCoO_2$ (B) having an average particle diameter $D_{50}$ of 3.5 μm with a weight ratio A:B=50:50.

Comparative Example 9

The same processes as those of Example 7 were performed, but with using only $LiCoO_2$ (B) having an average particle diameter $D_{50}$ of 3.5 μm.

Figure 3:
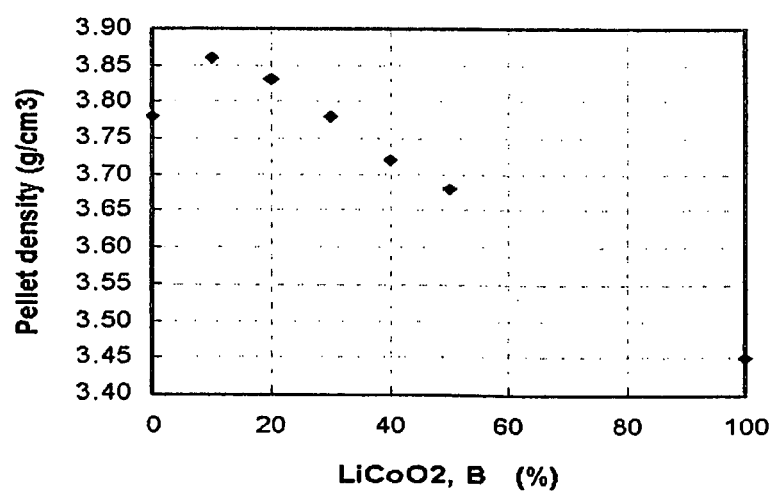
FIG. 3 is a graph showing densities of positive activation material pellets as a function of the relative amount of the second activation material. The pellets were produced according to Examples 2 and 7 to 9 and comparative examples 7 to 9.

Densities of the positive electrode plates and pellets manufactured according to Examples 2, 7 to 9 and Comparative Examples 7 to 9 were measured. As shown in FIG. 3, as the relative amount of $LiCoO_2$ (B), having a relatively small particle diameter, decreases, the density of the pellet increases. When the $LiCoO_2$ (B) is mixed into the $LiCoO_2$ (A) in an amount of from 10 wt % to 30 wt %, the density of the pellet is high.

The following examples compare life cycle of batteries containing positive electrode materials formed from mixtures of positive electrode activation materials according to various average particle diameters $D_{50}$ and various mixture ratios.

Example 10

A positive electrode composite slurry was manufactured by mixing $LiCoO_2$ (A) having an average particle diameter $D_{50}$ of 15.1 μm and $LiCoO_2$ (B) having an average particle diameter $D_{50}$ of 2.3 μm with a weight ratio A:B=90:10 to form a positive electrode activation material and dispersing the positive electrode activation material powder, an acetylene black conductive material, and a PVdF binder into an NMP solvent. A weight ratio (positive electrode activation material):(conductive material):(binder) was set to 96:2:2. The positive electrode composite slurry was coated onto an aluminum foil, and the resulting product was subject to drying and rolling processes, so that a positive electrode for a coin type battery was formed.

By using the manufactured positive electrode plate and a lithium metal as an opposite electrode thereof, a coin type half battery was manufactured in a glove box. In the examples, a mixture solution of ethylene carbonate (EC) and di-methyl carbonate (DMC) (volume ratio of 1:1) with 1 M $LiPF_6$ was used as the electrolyte solution.

Example 11

The same processes as those of Example 10 were performed, but with mixing of $LiCoO_2$ (A) having an average particle diameter $D_{50}$ of 15.1 μm and $LiCoO_2$ (B) having an average particle diameter $D_{50}$ of 3.5 μm.

Example 12

The same processes as those of Example 10 were performed, but with mixing of $LiCoO_2$ (A) having an average particle diameter $D_{50}$ of 15.1 μm and $LiCoO_2$ (B) having an average particle diameter $D_{50}$ of 5.0 μm.

Example 13

The same processes as those of Example 10 were performed, but with mixing of $LiCoO_2$ (A) having an average particle diameter $D_{50}$ of 18.8 μm and $LiCoO_2$ (B) having an average particle diameter $D_{50}$ of 2.3 μm.

Example 14

The same processes as those of Example 10 were performed, but with mixing of $LiCoO_2$ (A) having an average particle diameter $D_{50}$ of 18.8 μm and $LiCoO_2$ (B) having an average particle diameter $D_{50}$ of 3.5 μm.

Example 15

The same processes as those of Example 10 were performed, but with mixing of $LiCoO_2$ (A) having an average particle diameter $D_{50}$ of 18.8 μm and $LiCoO_2$ (B) having an average particle diameter $D_{50}$ of 5.0 μm.

Comparative Example 10

The same processes as those of Example 10 were performed, but with using only $LiCoO_2$ (A) having an average particle diameter $D_{50}$ of 11.1 μm.

Comparative Example 11

The same processes as those of Example 10 were performed, but with using only $LiCoO_2$ (A) having an average particle diameter $D_{50}$ of 15.1 μm.

The coin type batteries according to Examples 10 to 15 and Comparative Examples 10 to 11 were charged with a charge voltage of 4.2 V with 1 C at a temperature of 25° C. under a constant-current constant-voltage (CC-CV) condition. After that, under a constant current (CC) condition, the batteries were discharged with 1 C down to a voltage of 3V. By repeating charging and discharging 50 times, life cycles (capacity maintenance ratios) of the batteries were measured. The result of the measurements is shown in Table 2.

TABLE 2

| | LiCoO2, A D50 (μm) | LiCoO2, B D50 (μm) | Capacity maintenance ratio after 50 cycles (%) |
|---|---|---|---|
| Example 10 | 15.1 | 2.3 | 80% |
| Example 11 | | 3.5 | 85% |
| Example 12 | | 5.0 | 87% |
| Example 13 | 18.8 | 2.3 | 75% |
| Example 14 | | 3.5 | 68% |
| Example 15 | | 5.0 | 70% |
| Comparative Example 10 | 11.1 | — | 88% |
| Comparative Example 11 | 15.1 | — | 79% |

(Examples 10 to 15, A:B = 85:15 weight ratio)

As shown in Table 2, the life cycles of the batteries manufactured according to the examples according to aspects of the present invention, particularly, Examples 10 to 12, are substantially equal to those of conventional batteries (Comparative Examples 10 and 11).

According to an aspect of the present invention, the composite density of a positive electrode activation material for a lithium secondary battery may be increased, so that it is possible to increase a capacity per unit volume of a positive electrode and obtain an excellent life cycle thereof.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A positive electrode for a lithium secondary battery, the positive electrode including a positive electrode plate comprising a positive activation material mixture that intercalates and deintercalates lithium ions, wherein the positive activation material mixture comprises a first positive activation material having an average particle diameter $D_{50}$ of from 15.1 μm to 18.8 μm and a second positive activation material having an average particle diameter $D_{50}$ of from 2.3 μm to 5 μm, wherein a weight ratio of the first positive activation material to the second positive activation material in the positive activation material mixture is from 95:5 to 85:15, wherein the density of the positive electrode plate is at least 3.8 g/cm$^3$, and wherein the first positive activation material and the second positive activation material have the same or different chemical composition and are each independently selected from the group consisting of compounds of the following Chemical Formulas 1 and 2, $Li_xCo_{1-y}M_yA_2$      [Chemical Formula 1]

$Li_xCo_{1-y}M_yO_{2-z}X_z$      [Chemical Formula 2]

wherein 0.9≤x≤1.1, 0≤y≤0.5, 0≤z≤0.5, M is an element selected from the group consisting of Mg, Al, Co, K, Na, Ca, Si, Ti, Sn, V, Ge, Ga, B, As, Zr, Mn, Cr, Fe, Sr, V, and rare earth elements, A is an element selected from the group consisting of O, F, S, and P, and X is F, S, or P.

2. The positive electrode according to claim 1, wherein the first positive activation material has an average particle diameter $D_{50}$ of from 15.1 μm to 17 μm and the second positive activation material has an average particle diameter $D_{50}$ of from 2.3 μm to 4 μm.

3. The positive electrode according to claim 1, wherein the weight ratio is from 90:10 to 85:15.

4. The positive electrode according to claim 1, wherein the positive electrode includes a conductive material.

5. The positive electrode according to claim 4, wherein the conductive material includes at least one material selected from the group consisting of carbon-based conductive materials, carbon-black-based conductive materials, metal-based conductive materials, and metal-compound-based conductive materials.

6. The positive electrode according to claim 5, wherein the conductive material is from 0.1 wt % to 10 wt % of the positive electrode.

7. A lithium secondary battery comprising:
  a positive electrode including a positive electrode plate comprising a positive activation material mixture that intercalates and de-intercalates lithium ions;
  a negative electrode including a negative activation material that intercalates and deintercalates lithium ions; and
  a non-aqueous electrolyte solution,
  wherein the positive activation material mixture comprises a first positive activation material having an average particle diameter $D_{50}$ of from 15.1 μm to 18.8 μm and a second positive activation material having an average particle diameter $D_{50}$ of from 2.3 μm to 5 μm, wherein a weight ratio of the first positive activation material to the second positive activation material in the positive activation material mixture is from 95:5 to 85:15, wherein the density of the positive electrode plate is at least 3.8 g/cm$^3$, and wherein the first positive activation material and the second positive activation material have the same or different chemical composition and are each independently selected from the group consisting of compounds of the following Chemical Formulas 1 and 2, $Li_xCo_{1-y}M_yA_2$      [Chemical Formula 1]

$Li_xCo_{1-y}M_yO_{2-z}X_z$      [Chemical Formula 12]

wherein $0.9 \leq x \leq 1.1$, $0 \leq y \leq 0.5$, $0 \leq z \leq 0.5$, M is an element selected from the group consisting of Mg, Al, Co, K, Na, Ca, Si, Ti, Sn, V, Ge, Ga, B, As, Zr, Mn, Cr, Fe, Sr, V, and rare earth elements, A is an element selected from the group consisting of O, F, S, and P, and X is F, S, or P.

8. The lithium secondary battery according to claim 7, wherein the positive activation material has an average particle diameter $D_{50}$ of from 15.1 μm to 17 μm and the second positive electrode activation material has an average particle diameter $D_{50}$ of from 2.3 μm to 4 μm.

9. The lithium secondary battery according to claim 7, wherein the weight ratio is from 90:10 to 85:15.

10. The lithium secondary battery according to claim 7, wherein the positive electrode includes a conductive material.

11. The lithium secondary battery according to claim 10, wherein the conductive material includes at least one material selected from the group consisting of carbon-based conductive materials, carbon-black-based conductive materials, metal-based conductive materials, and metal-compound-based conductive materials.

12. The lithium secondary battery according to claim 11, wherein the conductive material is from 0.1 wt % to 10 wt % of the positive electrode.

13. The lithium secondary battery according to claim 7, wherein the negative activation material is selected from the group consisting of crystalline carbon, amorphous carbon, carbon composite, carbon fiber, lithium metal, and lithium alloy.

14. The lithium secondary battery according to claim 7, wherein the non-aqueous electrolyte solution includes a lithium salt and a non-aqueous organic solvent.

15. The lithium secondary battery according to claim 14, wherein the lithium salt includes one or two selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ wherein x and y are natural numbers, LiCl, and LiI.

16. The lithium secondary battery according to claim 14, wherein the non-aqueous electrolyte solution includes at least one solvent selected from the group consisting of carbonate, ester, ether, and ketone.

* * * * *

UNITED STATES PATENT AND TRADEMARK OFFICE
CERTIFICATE OF CORRECTION

PATENT NO.       : 8,691,445 B2
APPLICATION NO.  : 11/410053
DATED            : April 8, 2014
INVENTOR(S)      : Jung Joon Park et al.

Page 1 of 1

It is certified that error appears in the above-identified patent and that said Letters Patent is hereby corrected as shown below:

In the Claims

Col. 14, line 19,  Delete "$Li_xCo_{1-y}M_yO_{2-z}X_z$",
Claim 1, Chemical
Formula 2          Insert --$Li_xCo_{1-y}M_yO_{2-z}X_z$--

Col. 14, line 67,  Delete "[Chemical Formula 12]",
Claim 7
                   Insert --[Chemical Formula 2]--

Signed and Sealed this
Twelfth Day of July, 2016

Michelle K. Lee
*Director of the United States Patent and Trademark Office*